(12) United States Patent
Hayes et al.

(10) Patent No.: US 8,758,888 B2
(45) Date of Patent: Jun. 24, 2014

(54) CROSSLINKABLE IMIDE POLYESTER COATING

(75) Inventors: Gregory B. Hayes, Bowling Green, KY (US); Thomas J. Melnyk, Greenfield, MN (US)

(73) Assignee: Valspar Sourcing, Inc., Minneapolis, MN (US)

( * ) Notice: Subject to any disclaimer, the term of this patent is extended or adjusted under 35 U.S.C. 154(b) by 959 days.

(21) Appl. No.: 12/597,453

(22) PCT Filed: Apr. 22, 2008

(86) PCT No.: PCT/US2008/061137
§ 371 (c)(1),
(2), (4) Date: Oct. 23, 2009

(87) PCT Pub. No.: WO2008/134308
PCT Pub. Date: Nov. 6, 2008

(65) Prior Publication Data
US 2010/0136333 A1    Jun. 3, 2010

Related U.S. Application Data

(60) Provisional application No. 60/914,448, filed on Apr. 27, 2007.

(51) Int. Cl.
B32B 7/02 (2006.01)
B32B 15/08 (2006.01)

(52) U.S. Cl.
USPC ............ 428/212; 428/213; 428/217; 428/458

(58) Field of Classification Search
USPC .................................. 428/212, 213, 217, 458
See application file for complete search history.

(56) References Cited

U.S. PATENT DOCUMENTS

| | | | |
|---|---|---|---|
| 2,940,944 A | 6/1960 | Christenson | |
| 2,978,437 A | 4/1961 | Christenson | |
| 3,211,585 A | 10/1965 | Meyer et al. | |
| 4,055,551 A * | 10/1977 | Panandiker et al. | 528/45 |
| 4,362,861 A | 12/1982 | Shen | |
| 5,084,304 A | 1/1992 | Lienert et al. | |
| 5,141,818 A | 8/1992 | Lienert et al. | |
| 5,229,214 A | 7/1993 | Maze et al. | |
| 5,246,557 A | 9/1993 | Hughes et al. | |
| 5,306,526 A | 4/1994 | Gray et al. | |
| 5,376,460 A | 12/1994 | Hardeman et al. | |
| 5,380,816 A | 1/1995 | Sullivan | |
| 5,389,704 A | 2/1995 | Yabu | |
| 5,405,920 A | 4/1995 | Barbee et al. | |
| 5,514,747 A | 5/1996 | Hsu et al. | |
| 5,840,827 A | 11/1998 | Zupancic et al. | |
| 5,976,706 A | 11/1999 | Yezrielev et al. | |
| 6,046,326 A * | 4/2000 | Lavallee | 544/221 |
| 6,413,648 B1 | 7/2002 | Heyenk et al. | |
| 6,602,552 B1 | 8/2003 | Daraskevich et al. | |
| 6,827,971 B2 | 12/2004 | Grenda et al. | |
| 6,897,265 B2 | 5/2005 | Algrim et al. | |
| 7,071,267 B2 | 7/2006 | Algrim et al. | |
| 2004/0082733 A1 * | 4/2004 | Algrim et al. | 525/437 |

FOREIGN PATENT DOCUMENTS

| | | |
|---|---|---|
| GB | 835588 | 5/1960 |
| WO | WO 98/47974 | 10/1998 |

OTHER PUBLICATIONS

International Search Report for PCT/US2008/061137, 2 pages, (Jul. 17, 2008).
European Search report for related Application No. PCT/US2008061137 published Oct. 14, 2011 (6 pages).

* cited by examiner

*Primary Examiner* — Kevin R Kruer

(57) ABSTRACT

A primer/topcoat coil coating system employs crosslinkable branched hydroxyl-functional polyester-imide resins derived or derivable from a symmetric aromatic imide triol and a diacid or acid-producing derivative. The primer resin has a hydroxyl number greater than about 90 but not more than about 215, the topcoat resin has a hydroxyl number greater than about 100 but not more than about 215, and the primer and topcoat can each be hardened in 30 seconds or less to provide a coating having at least 0T flexibility with no tape off and at least 2H pencil hardness.

17 Claims, No Drawings

CROSSLINKABLE IMIDE POLYESTER COATING

CROSS REFERENCE TO RELATED APPLICATION

This application is a National Stage filing of International Application No. PCT/US2008/061137, filed Apr. 22, 2008, which claims priority under 35 U.S.C. 119 (e) to U.S. Provisional Application No. 60/914,448 filed Apr. 27, 2007 by Gregory B. Hayes and Thomas J. Melnyk, and entitled "Crosslinkable Imide Polyester Coating".

FIELD

This invention relates to polyester coil coatings.

BACKGROUND

Coil products are used to coat metallic substrates. The coating protects the substrate from outdoor or indoor elements and degradation (e.g., corrosion and UV degradation) as well as providing a smooth, even and appealing appearance. Some coil products are employed to make "coil coated" sheet stock. Coil coated sheet stock typically includes a roll of metallic substrate that is unwound, coated and rerolled for storage prior to fabrication. Coil products applied to such metallic substrates desirably will withstand the fabrication conditions to which the coil coated sheet stock may subsequently be subjected while meanwhile protecting the metallic substrate. The coil product accordingly should meet unique requirements for the intended use. These requirements typically include durability, hardness, flexibility, impact resistance, and the like. Unfortunately, it is especially difficult to formulate coil product coating compositions so that they will provide both high hardness and high flexibility. Normally an increase in coating hardness will require a sacrifice in coating flexibility, and an increase in coating flexibility will require a sacrifice in coating hardness. The curing or hardening conditions employed when making coil coated sheet stock also make it difficult to attain coatings with high pencil hardness values. Commercial coil coating lines usually employ a heating cycle lasting 30 seconds or less. Longer heating cycle times might in some instances provide an improvement in pencil hardness, but owing to line speed constraints and the installed equipment base it is undesirable to extend the heating cycle past 30 seconds. It can also be difficult to attain high pencil hardness values on some substrates (e.g., hot-dipped galvanized steel) or using some pigmented coatings (e.g., high gloss black coatings). Thus it has been difficult to use existing line equipment and existing formulations to fabricate a range of coil coated sheet stock whose coatings have a 0T T-bend flexibility rating using the test described in ASTM D4145-83 and a 2H or higher pencil hardness rating using the test described in ASTM D 3363-00.

From the foregoing, it will be appreciated that what is needed in the art are coil coating compositions (preferably low cost coating compositions) that provide a desirable combination of flexibility and hardness when applied to a range of substrates at commercially acceptable line speeds. Such coating compositions, articles made using these coating compositions, and methods for preparing the coating compositions and articles are disclosed and claimed herein.

SUMMARY OF THE INVENTION

In one embodiment the invention provides a coated substrate comprising a metallic substrate coil having first and second major surfaces and a primer and topcoat coating system on at least one major surface, wherein the primer and topcoat each comprise a binder containing (a) a branched hydroxyl-functional imide polyester resin derived or derivable from (i) a symmetric heterocyclic imide triol and (ii) a diacid or acid-producing derivative thereof, and (b) a blocked polyisocyanate crosslinking agent, wherein the primer imide polyester resin has a hydroxyl number greater than about 90 but not more than about 215, the topcoat imide polyester resin has a hydroxyl number greater than about 100 but not more than about 215, and the primer and topcoat can each be hardened in 30 seconds or less to provide a coating having at least 0T flexibility with no tape off and at least 2H pencil hardness.

In another embodiment, the invention provides a method for making a coated coil, the method comprising the steps of:
(a) providing a metallic substrate;
(b) providing primer and topcoat coating compositions each comprising (a) a branched hydroxyl-functional imide polyester resin derived or derivable from (i) a symmetric heterocyclic imide triol and (ii) a diacid or acid-producing derivative thereof, and (b) a blocked polyisocyanate crosslinking agent, wherein the primer imide polyester resin has a hydroxyl number greater than about 90 but not more than about 215 and the topcoat imide polyester resin has a hydroxyl number greater than about 100 but not more than about 215;
(c) applying the primer coating composition onto at least one major surface of the substrate;
(d) hardening the primer coating composition;
(e) applying the topcoat coating composition onto the hardened primer composition;
(f) hardening the topcoat coating composition; and
(g) winding the thus-coated substrate into a coil.

In yet another embodiment, the invention provides a coil coating system comprising primer and topcoat coating compositions each comprising (a) a branched hydroxyl-functional imide polyester resin derived or derivable from (i) a symmetric heterocyclic imide triol and (ii) a diacid or acid-producing derivative thereof, and (b) a blocked polyisocyanate crosslinking agent, wherein the primer imide polyester resin has a hydroxyl number greater than about 90 but not more than about 215 and the topcoat imide polyester resin has a hydroxyl number greater than about 100 but not more than about 215.

DETAILED DESCRIPTION

The terms "a," "an," "the," "at least one," and "one or more" are used interchangeably.

The recitation of numerical ranges by endpoints includes all numbers subsumed within that range (e.g., 1 to 5 includes 1, 1.5, 2, 2.75, 3, 3.80, 4, 5, etc.).

The term "comprises" and variations thereof does not have a limiting meaning where such term appears in the description or claims. For example, a composition comprising a pigment means that the composition includes one or more pigments.

The terms "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

A polymer "backbone" means repeated elements within a main polymer chain excluding pendent groups. For example, a polymer having a polyester backbone contains repeating polyester linkages excluding pendant groups.

A "branched" polymer means a polymer having a nonlinear polymer backbone.

A "symmetric" heterocyclic triol means a cyclic monomer having 3 hydroxyl functional groups of the same reactivity evenly spaced around the center of the molecule.

The disclosed method may be employed using a variety of metallic substrates including aluminum, iron, nickel, steel (e.g., stainless steel, cold-rolled steel, hot-dipped galvanized steel and electrocoated galvanized steel) and tin. The substrate may for example be provided in wound (coiled) form and unwound and rewound after the disclosed coating compositions are applied and hardened. The substrate may also be provided in sheet form (e.g., at the end of a rolling mill) and wound into a coil after the disclosed coating compositions are applied and hardened.

A variety of hydroxyl-functional imide polyester resins may be used in the disclosed method and coating system. The imide polyester resin includes a heterocyclic ring containing nitrogen atoms and is derived from or may be derived from a symmetric heterocyclic imide triol and a dicarboxylic acid (viz., a diacid). Acid-producing derivatives such as acid anhydrides, acid chlorides or esters (e.g., half esters or diesters) may be used in place of some or all of the diacid. The imide polyester resin is branched rather than linear. Additional hydroxyl-functional monomers (e.g., alcohols or glycols) and additional acids (e.g., monoacids and tri- or higher-functional acids and acid-producing derivatives thereof) may also be included in the reaction mixture from which the imide polyester resin is or may be formed.

A preferred symmetric heterocyclic imide triol is 1,3,5-tris (2-hydroxyethyl) isocyanurate:

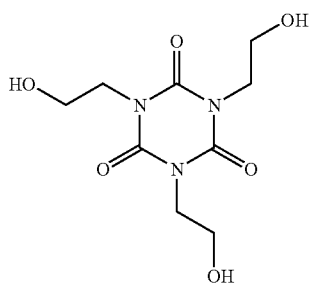 [SMILES: O=c1n(CCO)c(=O)n(CCO)c(=O)n1CCO]

Other symmetric heterocyclic imide triols include 1,3,5-tris (hydroxymethyl) isocyanurate, 1,3,5-tris(2-hydroxy-n-propyl) isocyanurate, 1,3,5-tris(4-hydroxybutyl) isocyanurate, 1,3,5-tris(4-hydroxy-3,5di-tert-butyl benzyl) isocyanurate, 1,3,5-tris(3,5-di-tert-butyl-4-hydroxybenzyl) isocyanurate and 1,3,5-tris(4-tert-butyl-3-hydroxy-2,6-dimethylbenzyl) isocyanurate. The heterocyclic imide triol preferably represents about 10 to about 40 wt. % of the imide polyester reaction mixture, and more preferably about 20 to about 30 wt. %. Different heterocyclic imide triols may be used in the primer and topcoat.

The diacid or acid-producing derivative thereof may be an aliphatic, aromatic or cycloaliphatic acid or acid-producing derivative thereof. The aliphatic diacids and acid-producing derivatives may be linear or branched. Exemplary diacids include maleic acid, chloromaleic acid, fumaric acid, itaconic acid, citraconic acid, mesaconic acid, malic acid, succinic acid, tetrapropenyl succinic acid, diglycolic acid, glutaric acid, d-methylglutaric acid, adipic acid, sebacic acid, pimelic acid, suberic acid, o-phthalic acid, isophthalic acid (IPA), terephthalic acid (TPA), dihydrophthalic acid, tetrahydrophthalic acid, hexahydrophthalic acid, tetrachlorophthalic acid, azelaic acid, chlorendic acid, dodecanedicarboxylic acid, cis-5-norbornene-2,3-dicarboxylic acid, 2,6-naphthalene dicarboxylic acid, dimethyl-2,6-naphthenic dicarboxylic acid, 1,4-cyclohexane dicarboxylic acid (CHDA) and dimer fatty acids such as EMPOL™ 1016 available from Cognis. Aromatic acids and cycloaliphatic acids are preferred. Different diacids or acid-producing derivatives thereof may be used in the primer and topcoat. It is also preferred to use primarily aromatic diacids to form the topcoat imide polyester resin and a blend of aromatic and cycloaliphatic diacids to form the primer imide polyester resin. Especially preferred diacids or acid-producing derivatives thereof include adipic acid, IPA, TPA, CHDA, hexahydrophthalic anhydride and phthalic anhydride.

Additional hydroxyl-functional monomers that may be included in the imide polyester reaction mixture include aliphatic, aromatic and cycloaliphatic alcohols, and symmetric and asymmetric aliphatic, aromatic and cycloaliphatic diols and tri- or higher-functional polyols. Aliphatic hydroxyl-functional monomers may be linear or branched. Exemplary alcohols include benzyl alcohol, cyclohexanol, 2-ethylhexyl alcohol, 2-cyclohexyl ethanol, 2,2-dimethyl-1-propanol, lauryl alcohol, and the like. Exemplary symmetric diols and tri- or higher-functional polyols include ethylene glycol (EG), polyethylene glycol (PEG), diethylene glycol, triethylene glycol, dipropylene glycol, 1,3-propane diol (MPDiol), 2,2-dimethyl-1,3-propanediol (also referred to as neopentyl glycol or NPG), 1,4-butanediol, 1,5-pentanediol, 1,6-hexanediol, 1,4-cyclohexanediol, 1,4-bis(hydroxymethyl) cyclohexane (also referred to as cyclohexanedimethanol or CHDM), 5-norbornene-2,2-dimethylol, 2,3-norbornene diol, 2,2-bis-(p-hydroxycyclohexyl)-propane, bis(2-hydroxyethyl)ether (also referred to as diethylene ether glycol or DEG), hydroquinone bis(2-hydroxyethyl)ether, and the like. Exemplary asymmetric diols and tri- or higher-functional polyols include 1,2-propylene glycol, 2-methyl-1,3-propanediol, 2-butyl-2-ethyl-1,3-propanediol, 1,2-butanediol, 1,3-butanediol, 1,2-pentanediol, 1,3-pentanediol, 1,4-pentanediol, 2-methyl-2,4-pentanediol, 3-methyl-1,5-pentanediol, 2,2,4-trimethyl-1-3-pentanediol, 2,2-dimethyl-1,3-hexanediol, hydroxypivalyl hydroxypivalate (HPHP), trimethylol propane, di-trimethylol propane, 3-hydroxy-2,2-dimethylpropyl 3-hydroxy-2,2-dimethyl propanate, pentaerythritol, dipentaerythritol, tripentaerythritol, 2,2-dimethyl heptanediol, 2,2-dimethyl octanediol, 1,2-cyclohexanediol, and the like. Symmetric hydroxyl-functional monomers (e.g., NPG) are preferred. Different hydroxyl-functional monomers may be used in the primer and topcoat.

Additional monoacids and tri- or higher-functional acids and acid-producing derivatives thereof that may be included in the imide polyester reaction mixture include ethylhexanoic acid, propionic acid, trimellitic acid, benzoic acid, 1,2,4-benzenetricarboxylic acid, 1,2,4,5-benzenetetracarboxylic acid, and their anhydrides or esters. Different monoacids and tri- or higher-functional acids and acid-producing derivatives thereof may be used in the primer and topcoat.

The hydroxyl-functional imide polyester resin may be formed using techniques that will be familiar to persons having ordinary skill in the art. The resin preferably is formed using a catalyst while passing an inert gas through the reaction mixture. Esterification takes place almost quantitatively and may be monitored by determining the hydroxyl or acid numbers or by monitoring the Gardner-Holt viscosity of the product. The hydroxyl number for the primer resin desirably is less than that of the topcoat resin. Preferred hydroxyl-functional imide polyester resins for use in the primer have hydroxyl numbers of about 90 to about 150, more preferably about 95 to about 120. Preferred hydroxyl-functional imide polyester resins for use in the topcoat have hydroxyl numbers of about 100 to about 150, more preferably about 100 to about 125. Preferred acid numbers for both the primer and topcoat resins are about 2 to 20, more preferably between about 2 and 10. Preferred number average molecular weight (Mn) values for both the primer and topcoat resins are about 1,000 to 20,000, more preferably between about 1,500 and 10,000 and most preferably between about 2,500 and 5,000. The primer and topcoat typically will have somewhat different formulations and somewhat different properties. For example, the primer desirably is formulated to have greater flexibility than the topcoat, and the topcoat desirably is formulated to have greater pencil hardness than the primer.

A variety of blocked polyisocyanate crosslinking agents may be used in the disclosed method and coating compositions. Blocked isocyanates are isocyanates in which each isocyanate group has been reacted with a protecting or blocking agent to form a derivative which will dissociate on heating to remove the protecting or blocking agent and release the reactive isocyanate group. Suitable blocking agents for polyisocyanates include aliphatic, cycloaliphatic or aralkyl monohydric alcohols, hydroxylamines and ketoximes. Preferred blocked polyisocyanates dissociate at temperatures of around 160° C. or lower. Lower dissociation temperatures are desirable (assuming the coating is still stable at ambient temperatures) for energy savings reasons and where heat sensitive materials are being utilized. The polyisocyanate may be aliphatic, aromatic (including heterocyclic) or cycloaliphatic, and may be difunctional or higher-functional, e.g., trifunctional. Preferably the blocked polyisocyanate is a caprolactam-blocked diisocyanate. U.S. Pat. No. 5,246,557 describes a variety of other exemplary blocked polyisocyanates and is incorporated herein by reference. Exemplary commercially available blocked polyisocyanates include those based on diphenylmethane diisocyanate (MDI), toluene diisocyanate (TDI), hexamethylene diisocyanate (HDI) and isophorone diisocyanate (IPDI), such as DESMODUR™ BL 3175A, DESMODUR BL 3272 MPA, DESMODUR BL 3370 MPA, DESMODUR BL 3475 BA/SN, DESMODUR BL 4265 SN, DESMODUR PL 340, DESMODUR PL 350 and DESMODUR VP LS 2253, all available from Bayer MaterialScience, and VESTANAT™ B 1358 A, VESTANAT B 1358/100, VESTANAT B 1370 and VESTANAT EP-B 1481, all available from Degussa North America. Different polyisocyanates or different blocking agents may be used in the primer and topcoat. The blocked polyisocyanate preferably is provided in an amount sufficient to react with at least one-half the hydroxyl groups of the polyester resin, or in other words in an amount at least one-half the stoichiometric equivalent of the polyester resin hydroxyl functionality. Preferably, the blocked polyisocyanate crosslinking agent amount is sufficient to substantially completely react with all of the polyester resin hydroxyl functionality. Yet higher crosslinking agent amounts may be employed, e.g., amounts from about 2 to about 12 equivalents per equivalent of hydroxyl functionality.

The disclosed compositions may also contain additional crosslinking agents if desired. Exemplary additional crosslinking agents are polyfunctional monomers or oligomers that will react with hydroxyl groups, such as aminoplasts (viz., oligomers which are reaction products of amines with aldehydes, particularly formaldehyde); amino- or amido-group-carrying substances exemplified by melamine, urea, dicyandiamide, benzoguanamine and glycoluril; and crosslinking agents such as those described in U.S. Pat. Nos. 2,940,944 and 2,978,437 and in U.K. Published Patent Application No. GB 835,588. For example, the addition of a quantity of melamine crosslinking agent may provide a further improvement in pencil hardness. Many of the above-mentioned additional crosslinking agents may be modified or may be provided as precursors. For example, aminoplasts may be modified with alkanols having from one to four carbon atoms to form various etherified aminoplasts. Aminoplast precursors such as hexamethylol melamine, dimethylol urea and hexamethoxymethyl melamine may also be employed. Exemplary commercially available additional crosslinking agents include CYMEL™ 301, CYMEL 303 and CYMEL 385 alkylated melamine-formaldehyde resins, all available from Cytec Corp. and RESIMENE aminoplast resins commercially available from Solutia, Inc. Different additional crosslinking agents may be used in the primer and topcoat.

The disclosed compositions desirably are made up in organic solvents. A variety of such solvents may be employed, with solvents having low volatile organic compounds being preferred. Exemplary solvents include 1-methoxy-2-propanol acetate, propylene glycol monomethyl ether acetate, cyclohexanone, isophorone, xylene, alcohols (e.g., butanol), high boiling aromatic solvents such as the "AROMATIC" series (e.g., AROMATIC 100 and AROMATIC 150 fluids) from ExxonMobil Corp. and the SHELLSOL™ series (e.g., SHELLSOL A100 and SHELLSOL A150 fluids) from Shell Chemical Co., and mixtures thereof. Different organic solvents may be used in the primer and topcoat.

The disclosed compositions may also contain pigments, fillers, and other optional adjuvants such as coalescing agents, dyes, thickeners, dispersing aids, flow modifiers, viscosity modifiers, antifoam agents, UV absorbers, inhibitors and initiators (including photoinitiators). Pigments (e.g., $TiO_2$) may be surface treated if desired, using a surface treatment chosen to fit the desired end use. For example, a coating made for an interior application may use a different treatment than one designed for exterior usage. Different pigments, fillers and other adjuvants may be used in the primer and topcoat. The amounts and types of pigments, fillers and other adjuvants will be familiar to persons having ordinary skill in the art.

The disclosed coating compositions desirably are applied in a two-coat (primer plus topcoat) system. More than two coats may be applied if desired, using for example a different layer in each coat or repeating one or both of the primer and topcoat layers. The application process may include spraying, dipping, or brushing but the substrate coil is particularly suited for a coil coating operation wherein the composition is wiped onto the substrate as it unwinds from a coil and then baked as the substrate travels toward an uptake coil winder. The primer and topcoat desirably are cured or hardened at a temperature from about 100 to about 300° C. For coil coating operations the coating desirably is baked to a peak metal temperature of from about 210 to about 254° C. Recommended hardening times are 30 seconds or less, e.g., about 20 to about 25 seconds for both primer and topcoat. Recommended dry film thicknesses are about 0.05 to about 0.5 mils (about 0.001 to about 0.013 mm) and more preferably about 0.1 to about 0.3 mils (about 0.003 to about 0.008 mm) for the primer, and about 0.5 to about 2 mils (about 0.013 to about 0.05 mm) and more preferably about 0.7 to about 0.8 mils (about 0.018 to about 0.02 mm) for the topcoat. The hardened coating system has a 0T T-bend flexibility rating with no tape off using the test described in ASTM D4145-83 and a pencil hardness of at least 2H, more preferably at least 3H and most preferably at least 4H using the test described in ASTM D 3363-00.

The disclosed method may be used to make coil coated substrates for use in a variety of products including appliances (e.g., microwave ovens, ranges, refrigerators, washers and clothes dryers; heating, ventilation and cooling (HVAC) equipment (e.g., air conditioners, boilers, furnaces and space heaters; cabinets (e.g., filing cabinets and cases for electronic equipment); light fixtures; suspended ceiling grids; Venetian blinds; automotive parts (e.g., bumper strips and interior trim pieces); siding; rain gutters and downspouts.

The following examples are offered to aid in understanding of the present invention and are not to be construed as limiting the scope thereof. Unless otherwise indicated, all parts and percentages are by weight. The hardened coating systems were evaluated using the following procedures:

Flexibility

The coated panels were subjected to flexibility testing according to ASTM D 4145-83. The sample size used was 15.2 cm.×25.4 cm. (6 in×10 in.). The sample was bent across the rolling direction of the metal and subjected to tape adhesion testing using a pressure sensitive tape (SCOTCH™ #610 tape, available from 3M Company) The minimum T-bend with No Tape Off (NTO) was recorded. "No Tape Off" denotes no coating pick-off on the pressure sensitive tape from the tape adhesion testing.

Pencil Hardness

Coating pencil hardness values were measured according to ASTM D 3363-00, using 15.2 cm.×25.4 cm. (6 in×10 in.) panels and pencils of varying hardness values pressed at a 45° angle against the coated panel. The hardest pencil that would not gouge the coating was noted, and the result was expressed according to the following scale:

(softest) 6B, 5B, 4B, 3B, 2B, B, HB, F, H, 2H, 3H, 4H, 5H, 6H (hardest)

EXAMPLE 1

Preparation of an Imide Polyester Primer Resin

A reaction mixture containing 350 parts adipic acid, 464 parts NPG, 637 parts CHDA, 548 parts 1,3,5-tris(2-hydroxyethyl) isocyanurate, and 2.0 parts dibutyl tin oxide were charged to a vessel equipped with an agitator, packed column, condenser, thermometer, and inert gas inlet. The vessel was flushed with inert gas and the contents heated to 230° C. over a 6-hour period while removing water. The batch temperature was held at 230° C. until an acid number less than 8 and a viscosity (measured as a 60% solution in a 60/40 blend of AROMATIC 150/propylene glycol monomethyl ether acetate) of Z-Z1 (Gardner) were achieved. The final product had an acid number of 8.0, a hydroxyl number of 99.0, and a viscosity of Z+ (Gardner). The color as measured on the Gardner scale was 1 and the resin was free of haze.

EXAMPLE 2

Preparation of an Imide Polyester Topcoat Resin

A reaction mixture containing 326 parts adipic acid, 435 parts NPG, 297 parts CHDA, 542 parts 1,3,5-tris(2-hydroxyethyl) isocyanurate, 284 parts IPA and 1.8 parts dibutyl tin oxide were charged to a vessel equipped with an agitator, packed column, condenser, thermometer, and inert gas inlet. The vessel was flushed with inert gas and the contents heated to 230° C. over a 4-hour period while removing water. The batch temperature was held at 230° C. until an acid number less than 10 and a viscosity (measured as a 55% solution in a 60/40 blend of AROMATIC 150/propylene glycol monomethyl ether acetate) of V-Y (Gardner) were achieved. The final product had an acid number of 9.0, a hydroxyl number of 115, and a viscosity of V+ (Gardner). The color as measured on the Gardner scale was 1 and the resin was free of haze.

EXAMPLE 3

Preparation of a White Primer Formulation A)

A coating base was made by first dispersing 248 parts RCl-6 treated rutile titanium dioxide pigment (from Millennium Chemical, and having a silicon dioxide and aluminum hydroxide surface treatment and a 325 mesh size) in 197 parts Example 1 primer resin, 60 parts of isophorone and 12 parts xylene until a Hegman reading of 7+ was obtained. Subsequently, 242 parts Example 1 primer resin, 254 parts DESMODUR™ BL-3175A blocked hexamethylene diisocyanate (from Bayer MaterialScience), 28 parts DBE dibasic esters (from E.I. du Pont de Nemours and Co.), 50 parts xylene, 12 parts 2-methoxy propyl acetate, and 3.0 parts COROC™ A-620A2 acrylic resin solution (from Cook Composites and Polymers) were added and mixed thoroughly. The coating was adjusted to a viscosity of 21 seconds on a #4 Zahn cup at 25° C. (77° F.) using xylene solvent.

EXAMPLE 4

Preparation of a White Topcoat (Formulation B)

A coating base was made by first dispersing 58 parts RCl-6 titanium dioxide pigment in 24.2 parts Example 2 topcoat resin, 3.4 parts isophorone and 3.4 parts xylene until a Hegman reading of 7+ was obtained. Subsequently, 36.9 parts Example 2 topcoat resin, 40.2 parts VESTANAT™ EP-B 1481 caprolactam-blocked cycloaliphatic polyisocyanate crosslinker (from Degussa), 9.3 parts isophorone, 4.7 parts xylene, 4.7 parts AROMATIC 150 fluid, 0.45 parts dibutyltin dilaurate, and 0.54 parts COROC A-620A2 acrylic resin solution were added and mixed thoroughly. The coating was adjusted to a viscosity of 21 seconds on a #4 Zahn cup at 25° C. (77° F.) using xylene solvent.

COMPARATIVE EXAMPLE 1

Preparation of a Melamine-Crosslinked White Topcoat (Formulation C)

A coating base was made by first dispersing 248 parts RCl-6 titanium dioxide pigment in 197 parts Example 1 primer resin, 60 parts isophorone and 12 parts xylene until a Hegman reading of 7+ was obtained. Subsequently, 242 parts Example 1 primer resin, 75 parts RESIMENE™ 747 aminoplast resin (from Solutia, Inc.) and 15 parts DYNAPOL™ 1203 catalyst (from Degussa), 28 parts DBE dibasic esters, 50 parts xylene, 12 parts 2-methoxy propyl acetate, and 3.0 parts COROC A-620A2 acrylic resin solution were added and mixed thoroughly. The coating was adjusted to a viscosity of 21 seconds on a #4 Zahn cup at 25° C. (77° F.) using xylene solvent.

EXAMPLE 5

Preparation of a High Gloss Black Topcoat (Formulation D)

A coating base was made by first dispersing 3.4 parts RAVEN™ 14 carbon black pigment (from Columbian Chemicals Company) in 50 parts Example 2 topcoat resin, 15 parts isophorone and 3 parts xylene until a Hegman reading of 7+ was obtained. Subsequently, 61 parts Example 2 topcoat resin, 72.6 parts VESTANAT EP-B 1481 caprolactam-blocked cycloaliphatic polyisocyanate crosslinker, 2.5 parts 2-methoxy propyl acetate, 5 parts xylene, 2.5 parts AROMATIC 150 fluid, 0.09 parts dibutyltin dilaurate, and 0.8 parts COROC A-620A2 acrylic resin solution were added and mixed thoroughly. The coating was adjusted to a viscosity of 21 seconds on a #4 Zahn cup at 25° C. (77° F.) using xylene solvent.

EXAMPLE 6

Preparation of a High Gloss Black Topcoat (Formulation E)

A coating base was made by first dispersing 13.6 parts RAVEN 14 carbon black pigment in 218.2 parts Example 2 topcoat resin, 1.30 parts DISPERBYK™ 167 dispersing agent (from Byk-Chemie), 46 parts isophorone and 8 parts xylene until a Hegman reading of 7+ was obtained. Subsequently, 266 parts Example 2 topcoat resin, 235.3 parts VESTANAT EP-B 1481 caprolactam-blocked cycloaliphatic polyisocyanate crosslinker, 22 parts RESIMENE 735 aminoplast resin (from Solutia, Inc.), 15 parts 2-methoxy propyl acetate, 30 parts xylene, 15 parts AROMATIC 150 fluid and 3.2 parts dibutyltin dilaurate were added and mixed thoroughly. The coating was adjusted to a viscosity of 21 seconds on a #4 Zahn cup at 25° C. (77° F.) using xylene solvent.

COMPARATIVE EXAMPLE 2

Preparation of a Melamine-Crosslinked Black Topcoat (Formulation F)

A coating base was made by first dispersing 19 parts RAVEN 14 carbon black pigment in 168 parts DYNAPOL® LH818-05 polyester resin (from Degussa, and having a hydroxyl number of 20), 0.62 parts DISPERBYK 167 dispersing agent, 64 parts xylene and 12 parts DBE dibasic esters until a Hegman reading of 7+ was obtained. Subsequently, 394 parts DYNAPOL LH818-05 polyester resin, 33 parts RESIMENE 747 aminoplast resin, 65 parts isophorone, 5 parts COROC A-620A2 acrylic resin solution, 18 parts 2-methoxy propyl acetate, 28 parts xylene and 18 parts DBE dibasic esters. The coating was adjusted to a viscosity of 21 seconds on a #4 Zahn cup at 25° C. (77° F.) using xylene solvent.

EXAMPLE 7

Preparation of Coated Panel

Using an 8-gauge wire wound rod, Formulation A was applied as a primer coating to a 0.019-inch (0.0483 cm) thick cold-rolled steel panel which had been previously treated with BONDERITET™ 902 pretreatment (from Henkel). The panel was placed in a 650° F. (324° C.) oven and baked for 19 seconds to a peak metal temperature of 480° F. (249° C.), forming a primed panel whose primer coating had a dry film thickness of 0.20 mils (5.1 μm) as evaluated using a Crater Film Measurement System (from DJH Designs, Inc.). The edges of the panel were trimmed. Using a 32-gauge wire wound rod, Formulation B was applied as a topcoat over the primer coating. The panel was placed in a 650° F. (324° C.) oven and baked for 19 seconds to a peak metal temperature of 480° F. (249° C.), forming a topcoated panel whose coating system had a total dry film thickness of 0.90 mils (22.9 μm). The physical test characteristics of the coated panel are shown below in Table A.

EXAMPLES 8-9 AND COMPARATIVE EXAMPLES 3-4

Preparation of Coated Panels

Using the method of Example 7, Formulations C through F were applied as a topcoat over the Formulation A primer coating. The physical test characteristics of the coated panels are shown below in Table A.

TABLE A

| Example No. or Comparative Example No. | Topcoat Formulation | Pencil Hardness | T-bend Flexibility (No Tape Off) | T-bend Flexibility (No Paint Fracture, 10× magnification) |
|---|---|---|---|---|
| Ex. 7 | B | 3H | 0T | 2T |
| Comp. Ex. 3 | C | 4H | 3T | 5T |
| Ex. 8 | D | 2H | 0T | 0T |
| Ex. 9 | E | 3H | 0T | 1T |
| Comp. Ex. 4 | F | F | 0T | 0T |

The results in Table A show the preparation of coil coatings having a 0T T-bend flexibility rating and a 2H or higher pencil hardness rating, using a 19 second hardening cycle.

Other embodiments of the invention include without limitation those listed below:

A method for making a coated coil, the method comprising the steps of:
(a) providing a coil substrate;
(b) providing primer and topcoat coating compositions each comprising (a) a branched hydroxyl-functional imide polyester resin derived or derivable from (i) a symmetric heterocyclic imide triol and (ii) a diacid or acid-producing derivative thereof, and (b) a blocked polyisocyanate crosslinking agent, wherein the primer imide polyester resin has a hydroxyl number greater than about 90 but not more than about 215 and the topcoat imide polyester resin has a hydroxyl number greater than about 100 but not more than about 215;
(c) applying the primer coating composition onto at least one major surface of the substrate;
(d) hardening the primer coating composition;
(e) applying the topcoat coating composition onto the hardened primer composition;
(f) hardening the topcoat coating composition; and
(g) winding the thus-coated substrate into a coil.

A method according to "the inventive method" further comprising applying the primer coating composition onto an aluminum, iron, nickel, steel or tin substrate.

A method according to "the inventive method" further comprising applying the primer coating composition onto a hot-dipped galvanized steel substrate.

A method according to "the inventive method" wherein the imide polyester resin is derived from 1,3,5-tris(2-hydroxyethyl) isocyanurate.

A method according to "the inventive method" wherein the diacid or acid-producing derivative thereof is aromatic or cycloaliphatic.

A method according to "the inventive method" wherein the diacid or acid-producing derivative thereof comprises adipic acid, isophthalic acid, 1,4-cyclohexane dicarboxylic acid, hexahydrophthalic anhydride, phthalic anhydride or mixture thereof.

A method according to "the inventive method" wherein the imide polyester resin is derived from a reaction mixture containing about 10 to about 40 wt. % heterocyclic imide triol.

A method according to "the inventive method" wherein the imide polyester resin is also derived from 2,2-dimethyl-1,3-propanediol.

A method according to "the inventive method" wherein the primer imide polyester resin has a hydroxyl number of about 90 to about 150, the topcoat imide polyester resin has a hydroxyl number of about 100 to about 150 and the primer resin hydroxyl number is less than the topcoat resin hydroxyl number.

A method according to "the inventive method" wherein the primer imide polyester resin has a hydroxyl number of about 95 to about 120 and the topcoat imide polyester resin has a hydroxyl number of about 100 to about 125.

A method according to "the inventive method" wherein the blocked polyisocyanate is based on diphenylmethane diisocyanate, toluene diisocyanate, hexamethylene diisocyanate, isophorone diisocyanate or mixture thereof.

A method according to "the inventive method" wherein the blocked polyisocyanate comprises a caprolactam-blocked diisocyanate.

A method according to "the inventive method" wherein the primer and topcoat further comprise pigment.

A method according to "the inventive method" wherein the topcoat is a glossy black coating.

A method according to "the inventive method" further comprising hardening the primer and topcoat at a temperature from about 100 to about 300° C. in 30 seconds or less.

A method according to "the inventive method" wherein the primer has a dry film thickness of about 0.001 to about 0.013 mm and the topcoat has a dry film thickness of about 0.013 to about 0.05 mm.

A method according to "the inventive method" wherein the coating has a pencil hardness of at least 3H.

A method according to "the inventive method" wherein the coating has a pencil hardness of at least 4H.

A coil coating system comprising primer and topcoat coating compositions each comprising (a) a branched hydroxyl-functional imide polyester resin derived or derivable from (i) a symmetric heterocyclic imide triol and (ii) a diacid or acid-producing derivative thereof, and (b) a blocked polyisocyanate crosslinking agent, wherein the primer imide polyester resin has a hydroxyl number greater than about 90 but not more than about 215 and the topcoat imide polyester resin has a hydroxyl number greater than about 100 but not more than about 215.

A coating system according to "inventive coil coating system" wherein the imide polyester resin is derived from 1,3,5-tris(2-hydroxyethyl) isocyanurate.

A coating system according to "inventive coil coating system" wherein the imide polyester resin is derived from a dicarboxylic acid.

A coating system according to "inventive coil coating system" wherein the imide polyester resin is derived from an acid-producing derivative of a dicarboxylic acid.

A coating system according to "inventive coil coating system" wherein the diacid or acid-producing derivative thereof is aromatic or cycloaliphatic.

A coating system according to "inventive coil coating system" wherein the diacid or acid-producing derivative thereof comprises adipic acid, isophthalic acid, 1,4-cyclohexane dicarboxylic acid, hexahydrophthalic anhydride, phthalic anhydride or mixture thereof.

A coating system according to "inventive coil coating system" wherein the imide polyester resin is derived from a reaction mixture containing about 10 to about 40 wt. % heterocyclic imide triol.

A coating system according to "inventive coil coating system" wherein the imide polyester resin is also derived from 2,2-dimethyl-1,3-propanediol.

A coating system according to "inventive coil coating system" wherein the primer imide polyester resin has a hydroxyl number of about 90 to about 150, the topcoat imide polyester resin has a hydroxyl number of about 100 to about 150 and the primer resin hydroxyl number is less than the topcoat resin hydroxyl number.

A coating system according to "inventive coil coating system" wherein the primer imide polyester resin has a hydroxyl number of about 95 to about 120 and the topcoat imide polyester resin has a hydroxyl number of about 100 to about 125.

A coating system according to "inventive coil coating system" wherein the blocked polyisocyanate is based on diphenylmethane diisocyanate, toluene diisocyanate, hexamethylene diisocyanate, isophorone diisocyanate or mixture thereof.

A coating system according to "inventive coil coating system" wherein the blocked polyisocyanate comprises a caprolactam-blocked diisocyanate.

A coating system according to "inventive coil coating system" wherein the primer and topcoat further comprise pigment.

A coating system according to "inventive coil coating system" wherein the topcoat will provide a glossy black coating when hardened.

Having thus described many preferred embodiments of the present invention, those of skill in the art will readily appreciate that the teachings found herein may be applied to yet other embodiments within the scope of the attached claims. The complete disclosure of all patents, patent documents, and publications are incorporated herein by reference as if individually incorporated.

What is claimed is:

1. A coated substrate comprising a metallic substrate coil having first and second major surfaces and a primer and topcoat coating system on at least one major surface, wherein the primer and topcoat each comprise a binder containing (a) a branched hydroxyl-functional imide polyester resin derived or derivable from (i) a symmetric heterocyclic imide triol and (ii) a diacid or acid-producing derivative thereof, and (b) a blocked polyisocyanate crosslinking agent, wherein the primer imide polyester resin has a hydroxyl number of about 90 to 150, the topcoat imide polyester resin has a hydroxyl number of about 100 to 150, wherein the primer resin hydroxyl number is less than the topcoat resin hydroxyl number, and the primer and topcoat can each be hardened in 30 seconds or less to provide a coating having at least 0T flexibility with no tape off and at least 2H pencil hardness.

2. A coated substrate according to claim 1 wherein the substrate comprises aluminum, iron, nickel, steel or tin.

3. A coated substrate according to claim 1 wherein the substrate comprises hot-dipped galvanized steel.

4. A coated substrate according to claim 1 wherein the imide polyester resin is derived from 1,3,5-tris(2-hydroxyethyl)isocyanurate.

5. A coated substrate according to claim 1 wherein the imide polyester resin is derived from 1,3,5-tris(hydroxymethyl)isocyanurate, 1,3,5-tris(2-hydroxy-n-propyl)isocyanurate, 1,3,5-tris(4-hydroxybutyl)isocyanurate, 1,3,5-tris(4-hydroxy-3,5di-tert-butyl benzyl)isocyanurate, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate or mixture thereof.

6. A coated substrate according to claim 1 wherein the diacid or acid-producing derivative thereof is aromatic or cycloaliphatic.

7. A coated substrate according to claim 1 wherein the diacid or acid-producing derivative thereof comprises adipic acid, isophthalic acid, 1,4-cyclohexane dicarboxylic acid, hexahydrophthalic anhydride, phthalic anhydride or mixture thereof.

8. A coated substrate according to claim 1 wherein the imide polyester resin is derived from a reaction mixture containing about 10 to about 40 wt. % heterocyclic imide triol.

9. A coated substrate according to claim 1 wherein the imide polyester resin is also derived from 2,2-dimethyl-1,3-propanediol.

10. A coated substrate according to claim 1 wherein the primer imide polyester resin has a hydroxyl number of about 95 to about 120 and the topcoat imide polyester resin has a hydroxyl number of about 100 to about 125.

11. A coated substrate according to claim 1 wherein the blocked polyisocyanate is based on diphenylmethane diisocyanate, toluene diisocyanate, hexamethylene diisocyanate, isophorone diisocyanate or mixture thereof.

12. A coated substrate according to claim 1 wherein the blocked polyisocyanate comprises a caprolactam-blocked diisocyanate.

13. A coated substrate according to claim 1 wherein the primer and topcoat further comprise pigment.

14. A coated substrate according to claim 1 wherein the topcoat is a glossy black coating.

15. A coated substrate according to claim 1 wherein the primer and topcoat are cured or hardened at a temperature from about 100 to about 300.degree. C. in 30 seconds or less.

16. A coated substrate according to claim 1 wherein the primer has a dry film thickness of about 0.001 to about 0.013 mm and the topcoat has a dry film thickness of about 0.013 to about 0.05 mm.

17. A coated substrate according to claim 1 wherein the coating has a pencil hardness of at least 4H.

* * * * *